(12) United States Patent
Zhao

(10) Patent No.: US 11,741,330 B2
(45) Date of Patent: Aug. 29, 2023

(54) ELECTRONIC TAG LOCK

(71) Applicant: Shenzhen Wins Electronic Technology Co., Ltd., Guangdong (CN)

(72) Inventor: Shengfei Zhao, Guangdong (CN)

(73) Assignee: Shenzhen Wins Electronic Technology Co., Ltd., Guangdong (CN)

( * ) Notice: Subject to any disclaimer, the term of this patent is extended or adjusted under 35 U.S.C. 154(b) by 108 days.

(21) Appl. No.: 17/507,876

(22) Filed: Oct. 22, 2021

(65) Prior Publication Data

US 2022/0414410 A1 Dec. 29, 2022

(30) Foreign Application Priority Data

Jun. 24, 2021 (CN) .......................... 202121419643.1

(51) Int. Cl.
*G06K 19/07* (2006.01)
*H01R 12/75* (2011.01)
*H01R 12/88* (2011.01)

(52) U.S. Cl.
CPC ......... *G06K 19/0723* (2013.01); *H01R 12/75* (2013.01); *H01R 12/88* (2013.01)

(58) Field of Classification Search
CPC ..... G06K 19/0723; H01R 12/75; H01R 12/88
See application file for complete search history.

(56) References Cited

U.S. PATENT DOCUMENTS

| | | | |
|---|---|---|---|
| 2005/0231365 A1* | 10/2005 | Tester ................... | G09F 3/0347 292/307 R |
| 2011/0273852 A1* | 11/2011 | Debrody ............... | G09F 3/0317 361/747 |
| 2018/0025673 A1* | 1/2018 | Ritamäki .............. | G09F 3/0352 340/572.8 |

* cited by examiner

*Primary Examiner* — Omer S Khan
(74) *Attorney, Agent, or Firm* — Horizon IP Pte. Ltd

(57) ABSTRACT

This application discloses an electronic tag lock, which includes: a housing, a lock cable, a control circuit board, and a clamping mechanism arranged in the housing; the clamping mechanism includes several clamping components electrically connected to the control circuit board, the clamping components abut against outer circumference of the lock cable, the clamping components and the lock cable are electrically connected.

11 Claims, 11 Drawing Sheets

ELECTRONIC TAG LOCK

TECHNICAL FIELD

This application relates to an electronic tag lock.

BACKGROUND

Currently, transporting goods through containers is becoming more and more common, which also puts forward higher requirements on the management of containers. At the existing technology, the anti-theft marking of containers is generally done by adding disposable plastic seals or bullet seals to the keyholes of the container to mark that the container has not been opened. However, disposable plastic seals or bullet seals cannot notify the theft of container in time, and only serve as a reminder after the event, and thus cannot notify the owner of the container in time.

SUMMARY

In order to address the problems existing in related technologies, the present application provides an electronic tag lock, according the electronic tag lock, an RFID-based electronic tag lock is provided, which is provided with a control circuit board that can detect and record whether the loop formed by the lock cable and the control circuit board is electrically disconnected, so as to determine whether the electronic tag lock is broken or opened.

In order to address the above technical problems, the technical solutions adopted in the present application are as follows:

An electronic tag lock is provided, which includes: a housing, a lock cable, a control circuit board, and a clamping mechanism arranged in the housing; the housing is provided with a locking channel, the clamping mechanism acts on the lock cable inserted into the locking channel, the locking channel has an insertion opening for inserting one end of the lock cable, and the other end of the lock cable is fixed to the housing and electrically connected to the control circuit board; the clamping mechanism includes several clamping components electrically connected to the control circuit board, the clamping components abut against outer circumference of the lock cable, the clamping components and the lock cable are electrically connected; when the lock cable is inserted from the locking insertion opening to contact the clamping components and continue to be inserted in this direction, the lock cable is capable of driving the clamping mechanism to reduce the clamping force of the clamping components on the lock cable, so that the lock cable is capable of moving based on the clamping mechanism in this direction.

Preferably, the locking channel includes a pressing cavity communicating with the insertion opening, the pressing cavity has a narrowing part, and a cross section of the narrowing part gradually narrows from a side away from the insertion opening to a side close to the insertion opening; the clamping mechanism further includes an elastic component and a movable base, the movable base is arranged in the pressing cavity, the clamping component is movably arranged on an upper end of the movable base, the elastic component is arranged between the housing and the movable base, and the elastic component drives the upper end of the movable base to approach the insertion opening; when the clamping component is at a preset position of the narrowing part, the narrowing part is capable of forcing the clamping component to abut against the outer circumference of the lock cable.

Preferably, when the clamping component abuts against the outer circumference of the lock cable, the lock cable is driven in an opposite direction of the insertion direction of the lock cable, and the lock cable will drive the clamping component to move, to increase the clamping force of the clamping component on the lock cable, so that the lock cable cannot be pulled out of the clamping mechanism in this direction.

Preferably, metal balls are configured as the clamping components.

Preferably, the movable base is provided with a base body wire hole connecting the upper end and a lower end of the movable base; the upper end of the movable base is provided with several clamping assembly parts around the base body wire hole, and the clamping components are movably arranged in the clamping assembly parts; wherein the clamping components are capable of approaching or moving away from the base body wire hole based on the clamping assembly part.

Preferably, steel balls are provided as the clamping components, the upper end of the movable base is provided with several U-shaped grooves as clamping assembly parts, and the size of the arc part at the bottom of the U-shaped groove matches the diameter of the steel ball.

Preferably, three clamping assembly parts are evenly arranged around the outer circumference of the lock cable, and any clamping assembly part is provided with the clamping component.

Preferably, the lower end of the movable base is provided with a spring socket post, a spring is configured as the elastic component, and the elastic component is sleeved on the spring socket post.

Preferably, the housing includes a front housing and a rear housing that are buckled with each other, a fixing base is clamped and mounted between the front housing and the rear housing, and the locking channel is arranged at the fixing base; the fixing base is made of metal material and is electrically connected to the control circuit board; the control circuit is provided with a first elastic sheet, and the first elastic sheet abuts against outer circumference of the fixing base to electrically conduct the fixing base; an anti-falling block is fixed at one end of the lock cable fixed to the housing, and the housing is provided with an anti-falling clamping component matching the anti-falling block; the control circuit is provided with a second elastic sheet, and the second elastic sheet abuts against the outer circumference of the lock cable to electrically conduct the lock cable.

Preferably, a receiving part is provided on the outer circumference of the housing, and the lock cable is capable of being received in the receiving part; an outer surface of the housing which is different from that provided with the insertion opening is provided with an elastic buckle as the receiving part; the elastic buckle is U-shaped, and the lock cable is capable of being snapped in through the elastic deformation of the opening of the elastic buckle.

The technical solution provided by the present application may include the following beneficial effects: an electronic tag lock is provided, which includes: a housing, a lock cable, a control circuit board, and a clamping mechanism arranged in the housing; the housing is provided with a locking channel, the clamping mechanism acts on the lock cable inserted into the locking channel, the locking channel has an insertion opening for inserting one end of the lock cable, and the other end of the lock cable is fixed to the housing and electrically connected to the control circuit board; the clamping mechanism includes several clamping components electrically connected to the control circuit board, the clamping components abut against outer circumference of the lock cable, the clamping components and the lock cable are electrically connected; when the lock cable is inserted from the locking insertion opening to contact the clamping components and continue to be inserted in this direction, the lock cable is capable of driving the clamping mechanism to reduce the clamping force of the clamping components on the lock cable, so that the lock cable is capable of moving based on the clamping mechanism in this direction. A control circuit board is provided that can detect and record whether the loop formed by the lock cable and the control circuit board is electrically disconnected, so as to determine whether the electronic tag lock is broken or opened.

It should be understood that the above general description and the following detailed description are only exemplary and explanatory, and cannot limit the present application.

BRIEF DESCRIPTION OF DRAWINGS

The exemplary embodiments of the present application are described in more detail by referring to the accompanying drawings, the above and other objectives, features, and advantages of the present application will become more apparent, wherein, in the exemplary embodiments of the present application, the same reference numerals generally refer to the same components.

REFERENCE NUMERALS

Figure 1:
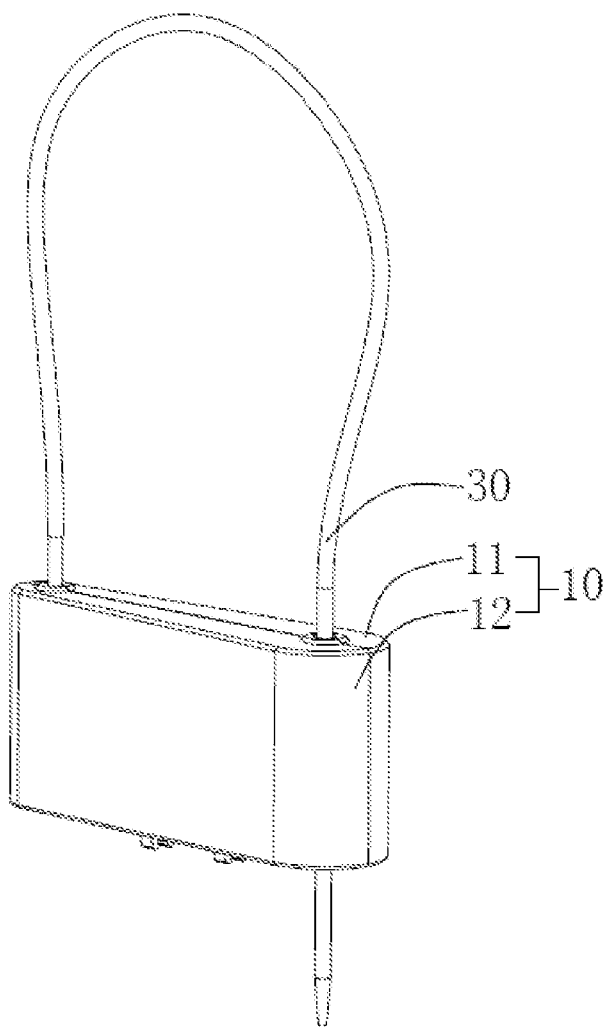
FIG. 1 is a schematic diagram of the overall structure shown in Embodiment 1 of the present application.

| numerals | component |
| --- | --- |
| 10 | housing |
| 11 | front housing |
| 12 | rear housing |
| 13 | receiving part |

-continued

| numerals | component |
| --- | --- |
| 20 | fixing base |
| 21 | locking channel |
| 22 | insertion opening |
| 23 | pressing cavity |
| 24 | narrowing part |
| 25 | bottom cover |
| 30 | lock cable |
| 31 | anti-falling block |
| 40 | control circuit board |
| 41 | first elastic sheet |
| 42 | second elastic sheet |
| 51 | clamping component |
| 52 | elastic component |
| 53 | movable base |
| 54 | base body wire hole |
| 55 | clamping assembly part |
| 56 | spring socket post |

DETAILED DESCRIPTION

The embodiments of the present application are described in detail below. Examples of the embodiments are shown in the accompanying drawings, wherein the same or similar reference numerals refer to the same or similar components or components with the same or similar functions. The embodiments described below with reference to the drawings are exemplary, and are intended to explain the present application, but should not be understood as a limitation to the present application.

In the present application, unless expressly stipulated and limited otherwise, the terms "mounted", "connected with", "connected", "fixed" and other terms should be understood in a broad sense, for example, it can be a fixed connection, a detachable connection, or an integral connection; it can be a mechanical connection or an electrical connection; it can be direct connection, or indirect connection through an intermediate medium, or it can be internal communication between the two components. For those of ordinary skill in the art, the specific meanings of the above-mentioned terms in the present application can be understood according to specific circumstances.

In the present application, unless expressly stipulated and limited otherwise, the first feature located "above" or "below" the second feature may include that the first feature and the second feature are in direct contact, or it may include that the first feature and the second feature are not in direct contact but through another feature between them. Further, the first feature located "above", "over", and "on" the second feature includes that the first feature directly above and obliquely above the second feature, or it simply means that the first feature is higher in level than the second feature. The first feature located "below", "under", and "beneath" the second feature, includes that the first feature directly below and obliquely below the second feature, or it simply means that the level of the first feature is smaller than the second feature.

The application will be further described in detail below through specific embodiments in conjunction with the drawings.

Embodiment 1

Figure 2:
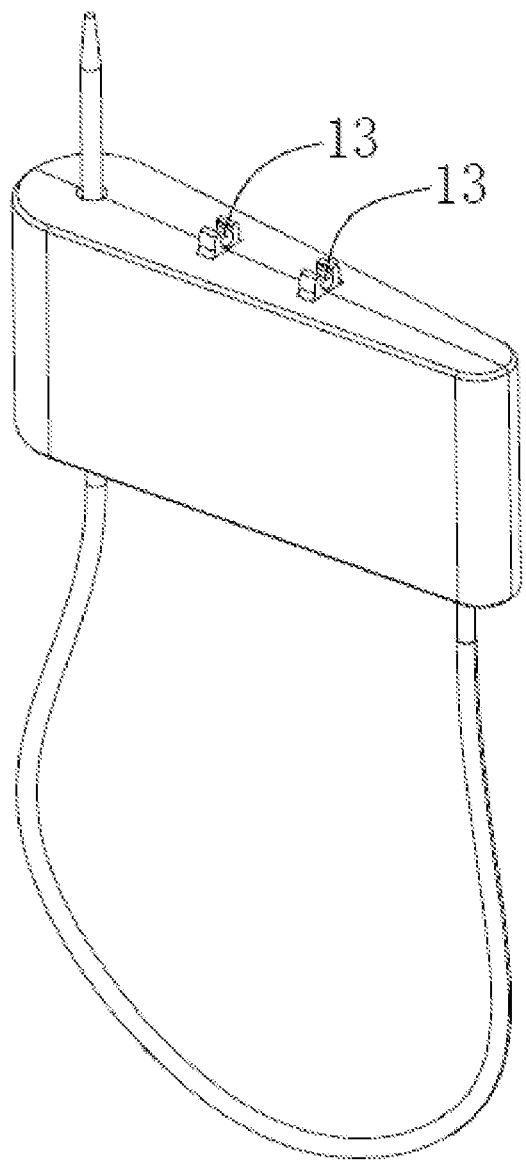
FIG. 2 is a schematic diagram 2 of the overall structure shown in Embodiment 1 of the present application.
Figure 3:
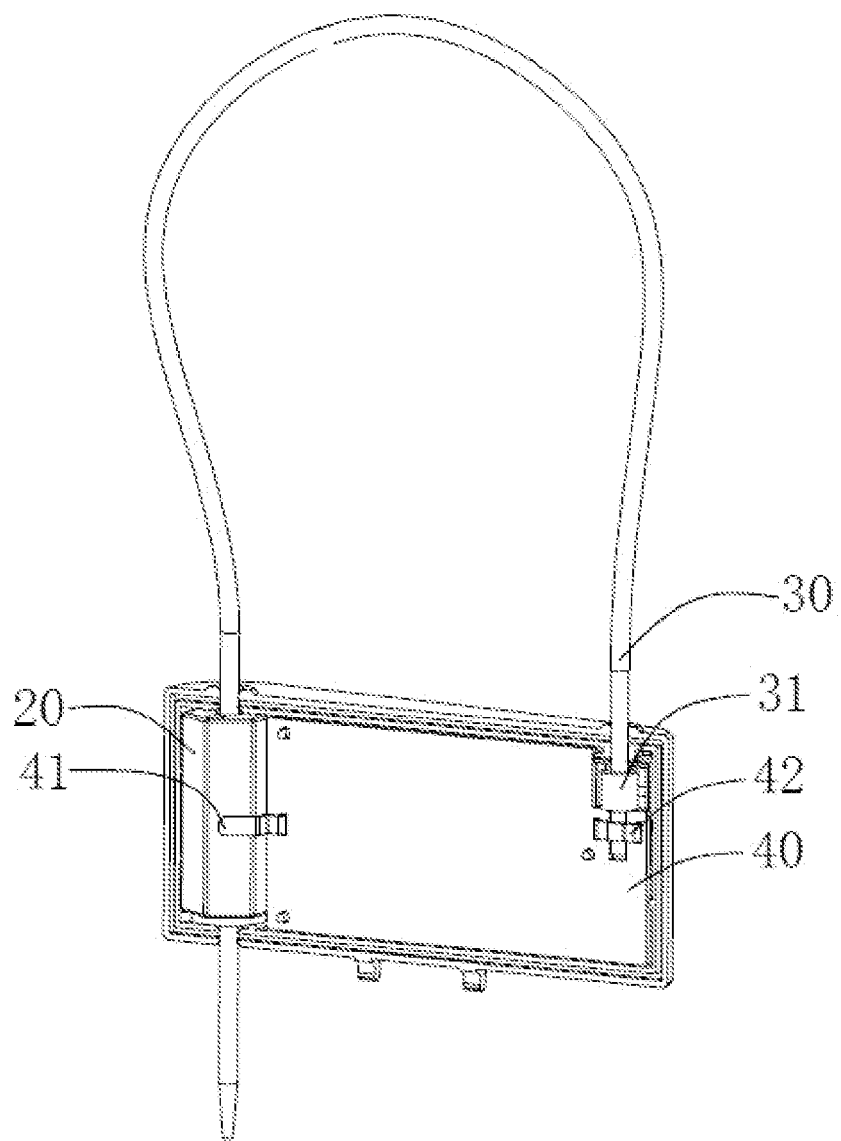
FIG. 3 is a schematic diagram of the overall structure shown in Embodiment 1 of the present application with the front housing hidden.
Figure 4:
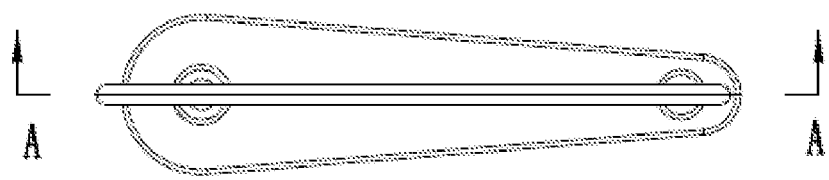
FIG. 4 is a schematic top diagram of the overall structure shown in Embodiment 1 of the present application.
Figure 5:
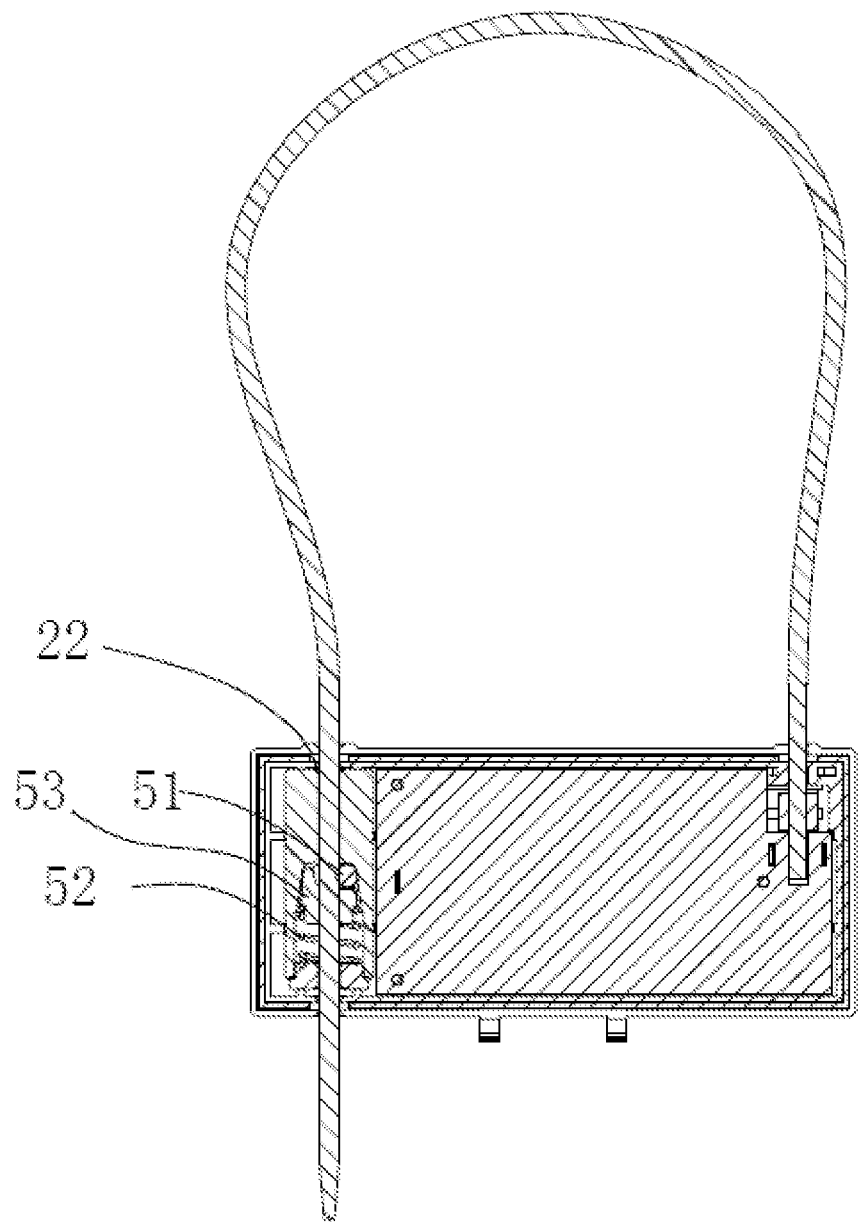
FIG. 5 is a schematic cross-sectional diagram at A-A in FIG. 4 shown in Embodiment 1 of the present application.
Figure 6:
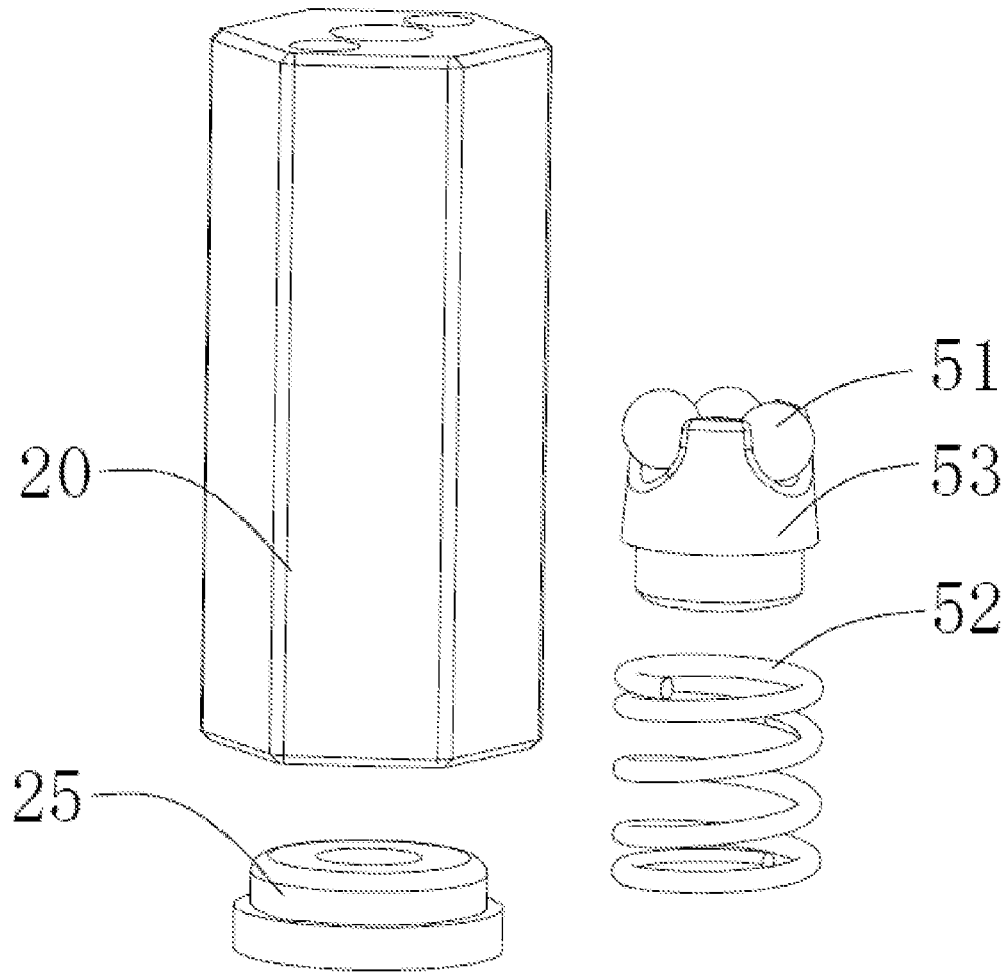
FIG. 6 is an exploded schematic diagram of the overall structure of the clamping mechanism shown in Embodiment 1 of the present application.
Figure 7:
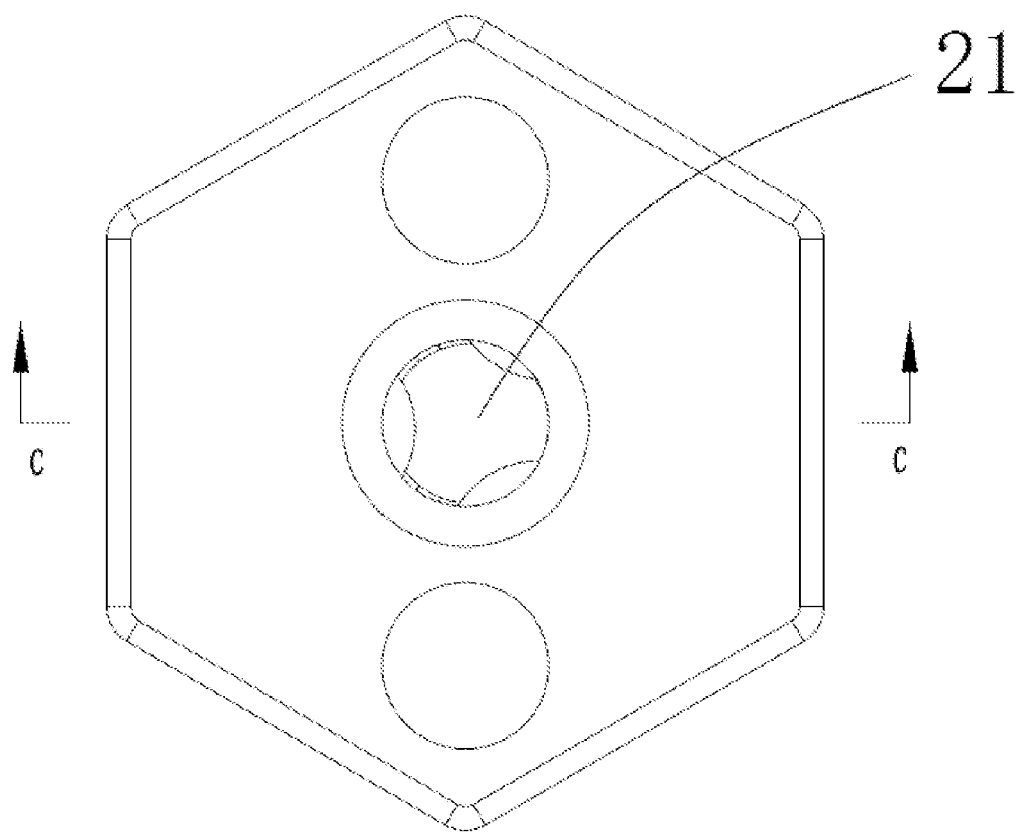
FIG. 7 is a schematic top diagram of the overall structure of the clamping mechanism shown in Embodiment 1 of the present application.
Figure 8:
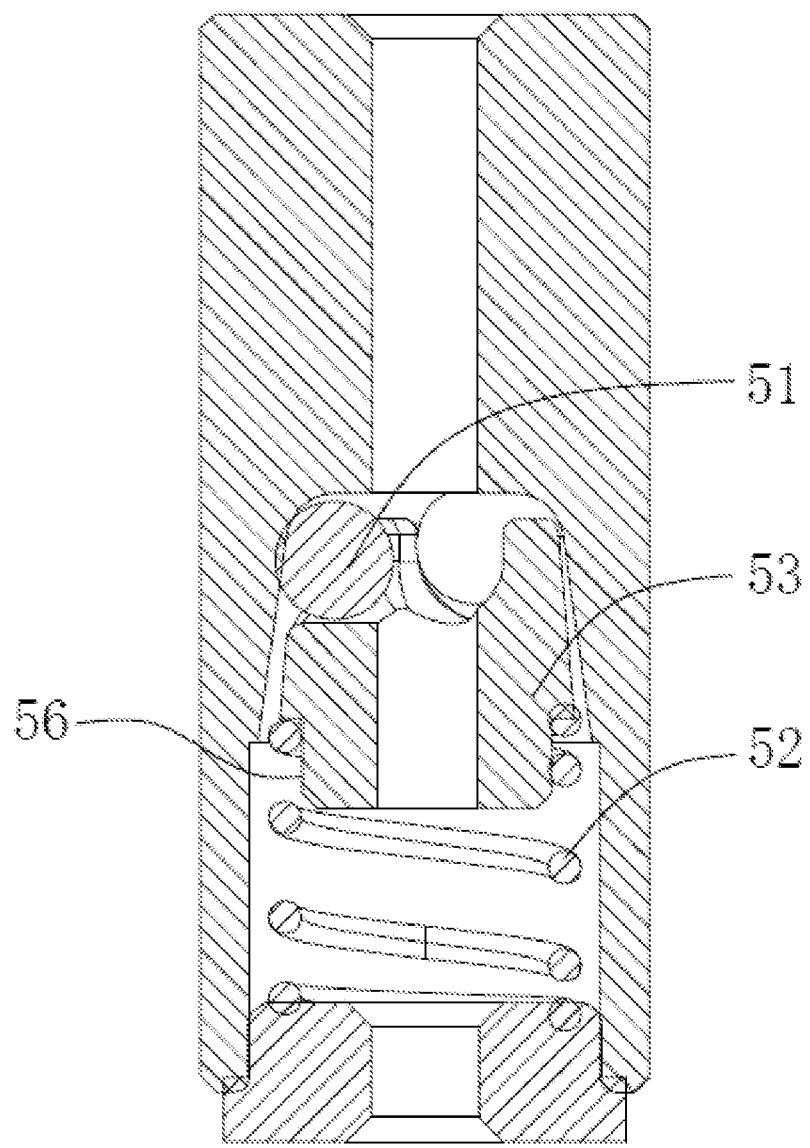
FIG. 8 is a schematic cross-sectional diagram at C-C in FIG. 7 shown in Embodiment 1 of the present application.
Figure 9:
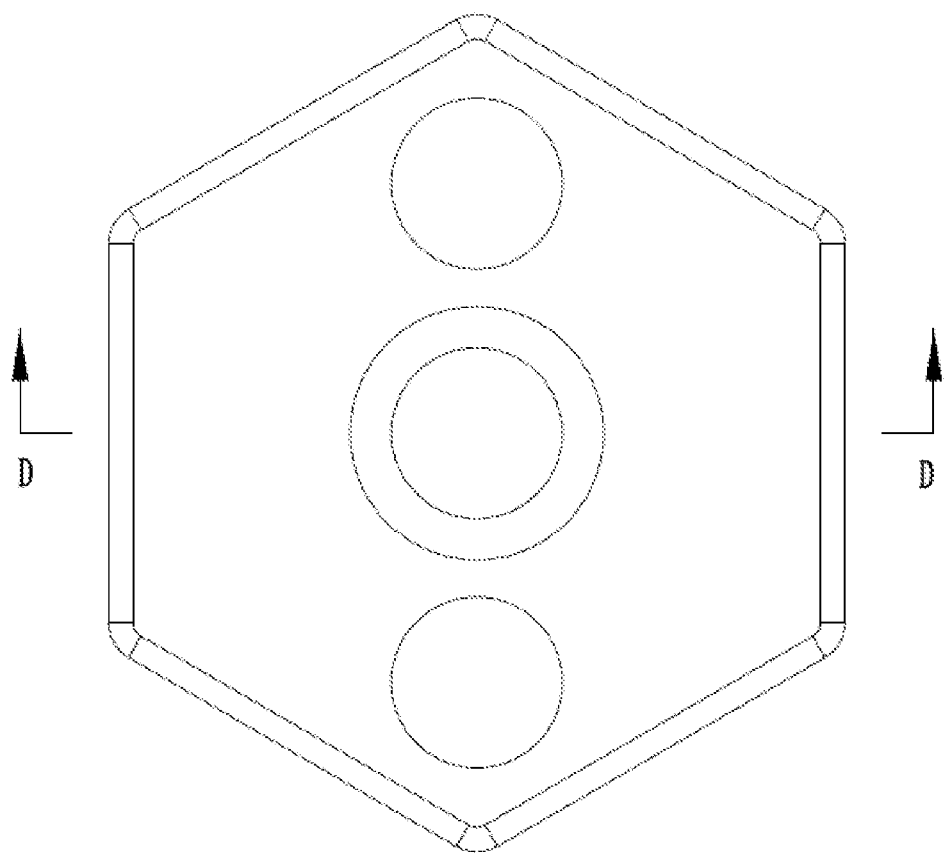
FIG. 9 is a schematic diagram of the overall structure of the fixing base shown in Embodiment 1 of the present application.
Figure 10:
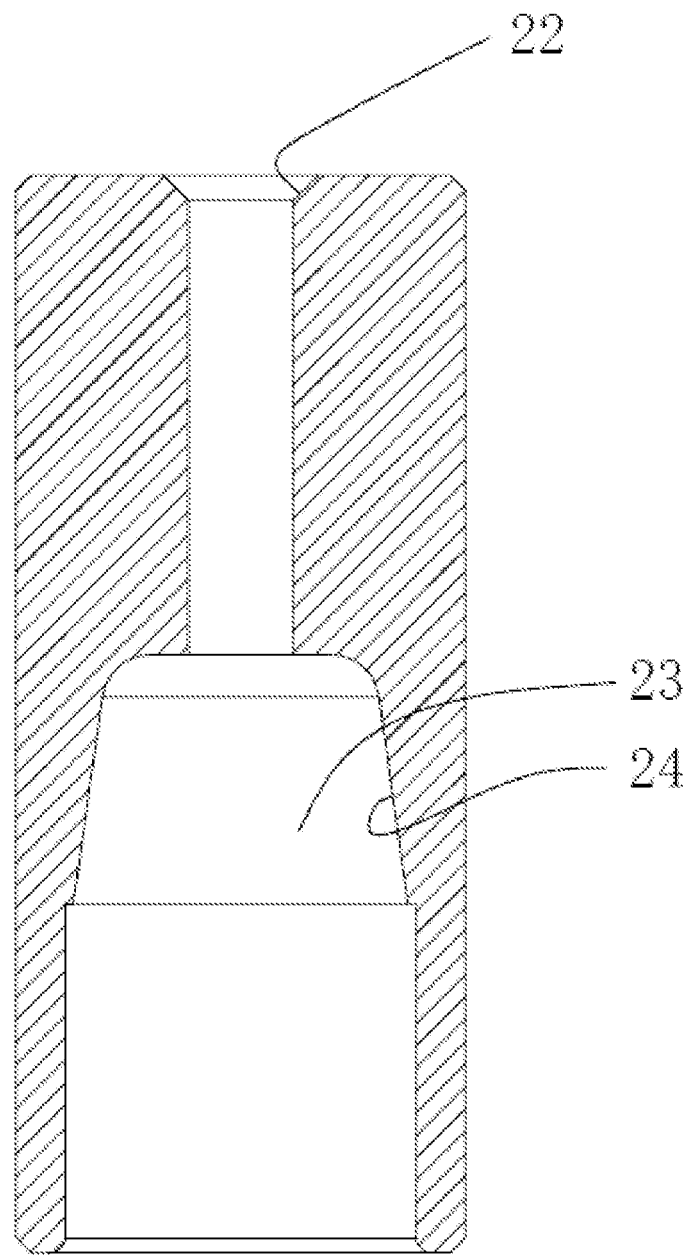
FIG. 10 is a schematic cross-sectional diagram at D-D in FIG. 9 shown in Embodiment 1 of the present application.
Figure 11:
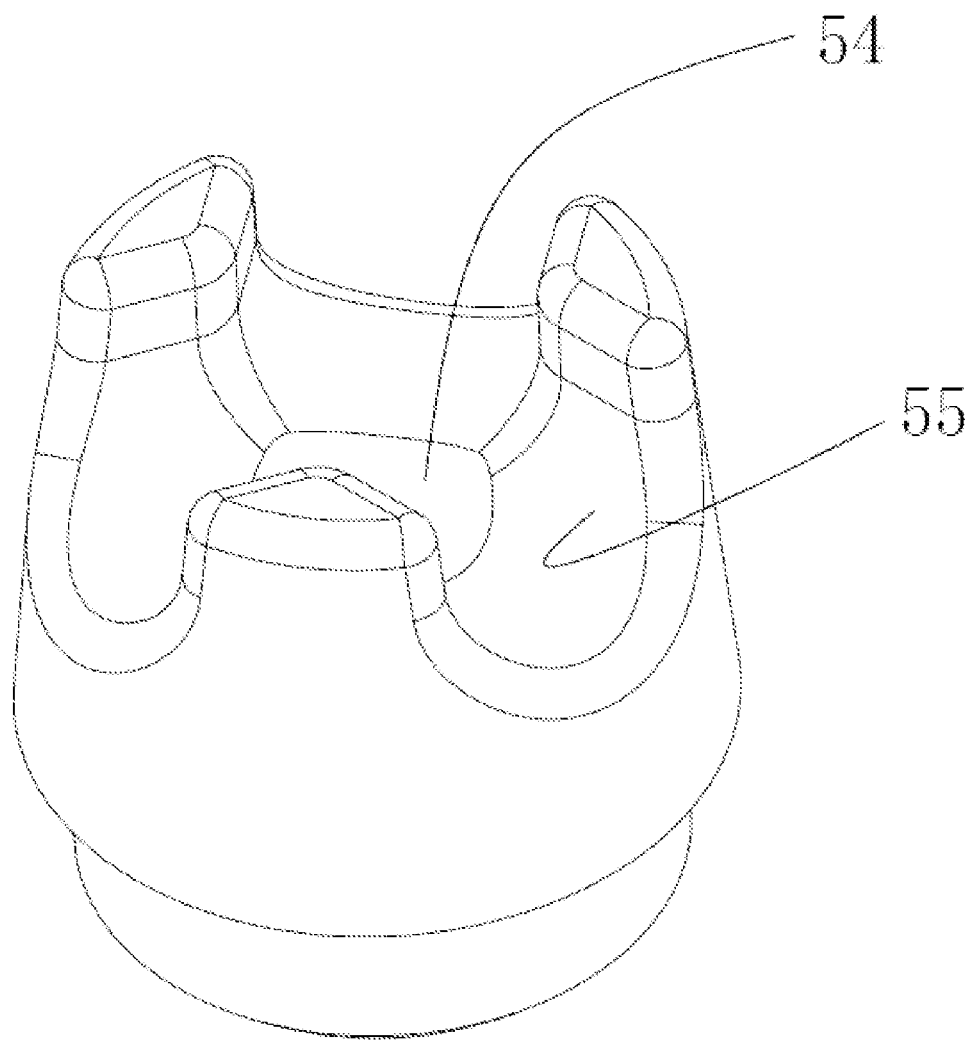
FIG. 11 is a schematic diagram of the overall structure of the movable base shown in Embodiment 1 of the present application.

Referring to FIG. 1 to FIG. 11, an electronic tag lock is provided, which includes: a housing 10, a lock cable 30, a control circuit board 40, and a clamping mechanism arranged in the housing 10; the housing 10 is provided with a locking channel 21, the clamping mechanism acts on the lock cable 30 inserted into the locking channel 21, the locking channel 21 has an insertion opening 22 for inserting one end of the lock cable 30, and the other end of the lock cable 30 is fixed to the housing 10 and electrically connected to the control circuit board 40; the clamping mechanism 40 includes several clamping components 51 electrically connected to the control circuit board, the clamping components 51 abut against outer circumference of the lock cable 30, the clamping components and the lock cable are electrically connected; when the lock cable 30 is inserted from the locking insertion opening to contact the clamping components 51 and continue to be inserted in this direction, the lock cable 30 is capable of driving the clamping mechanism to reduce the clamping force of the clamping components 51 on the lock cable, so that the lock cable 30 is capable of moving based on the clamping mechanism in this direction.

Specifically, the locking channel 21 includes a pressing cavity 23 communicating with the insertion opening 22, the pressing cavity 23 has a narrowing part 24, and a cross section of the narrowing part 24 gradually narrows from a side away from the insertion opening 22 to a side close to the insertion opening 22; the clamping mechanism further includes an elastic component 52 and a movable base 53, the movable base 53 is arranged in the pressing cavity 23, the clamping component 51 is movably arranged on an upper end of the movable base 53, the elastic component 52 is arranged between the housing 10 and the movable base 53, and the elastic component 52 drives the upper end of the movable base 53 to approach the insertion opening 22; when the clamping component 51 is at a preset position of the narrowing part 24, the narrowing part 24 is capable of forcing the clamping component 51 to abut against the outer circumference of the lock cable 30.

Based on the above structure, when the clamping component 51 abuts against the outer circumference of the lock cable 30, the lock cable 30 is driven in an opposite direction of the insertion direction of the lock cable, and the lock cable 30 will drive the clamping component 51 to move toward the narrowing part 24 where the cross-section is narrower, and the narrowing part 24 will further force the clamping component 51 to clamp the locking cable 30, to increase the clamping force of the clamping component on the lock cable, so that the lock cable 30 cannot be pulled out of the clamping mechanism in this direction.

As a prefer embodiment, metal balls are configured as the clamping components 51. In which, the movable base 53 is provided with a base body wire hole 54 connecting the upper end and a lower end of the movable base 53; the upper end of the movable base 53 is provided with several clamping assembly parts 55 around the base body wire hole 54, and the clamping components 51 are movably arranged in the clamping assembly parts 55; the clamping components 51 are capable of approaching or moving away from the base body wire hole 54 based on the clamping assembly part. Further, the upper end of the movable base 53 is provided with several U-shaped grooves as clamping assembly parts 55, and the size of the arc part at the bottom of the U-shaped groove matches the diameter of the steel ball.

In order to make the clamping component 51 tighten the cable more stable, three clamping assembly parts 55 are evenly arranged around the outer circumference of the lock cable, and any clamping assembly part 55 is provided with the clamping component 51.

For ease of assembly, the lower end of the movable base 53 is provided with a spring socket post 56, a spring is configured as the elastic component 52, and the elastic component 52 is sleeved on the spring socket post 56.

More specifically, the housing 10 includes a front housing 11 and a rear housing 12 that are buckled with each other, a fixing base 20 is clamped and mounted between the front housing 11 and the rear housing 12, and the locking channel 21 is arranged at the fixing base 20; the fixing base 20 is made of metal material and is electrically connected to the control circuit board 40; the control circuit is provided with a first elastic sheet 41, and the first elastic sheet 41 abuts against outer circumference of the fixing base 20 to electrically conduct the fixing base 20; an anti-falling block 31 is fixed at one end of the lock cable 30 fixed to the housing 10, and the housing 10 is provided with an anti-falling clamping component matching the anti-falling block 31; the control circuit is provided with a second elastic sheet 42, and the second elastic sheet 42 abuts against the outer circumference of the lock cable 30 to electrically conduct the lock cable 30; as an example, the fixing base 20 also includes a bottom cover 25, the bottom cover 25 is used to close the pressing cavity 23, opening the bottom cover 25 can be more convenient to assemble the steel ball, the movable base 53 and the elastic component 52.

Preferably, in order to receive the lock cable 30 during the transportation and storage of the electronic tag lock, a receiving part 13 is provided on the outer circumference of the housing 10, and the lock cable 30 is capable of being received in the receiving part 13; an outer surface of the housing 10 which is different from that provided with the insertion opening 22 is provided with an elastic buckle as the receiving part 13; the elastic buckle is U-shaped, and the lock cable 30 is capable of being snapped in through the elastic deformation of the opening of the elastic buckle.

The control circuit board 40 is provided with a radio frequency unit, as an example, the radio frequency unit includes SL3S1003-1013 chip, the two detection interfaces of the chip are respectively electrically connected to the two ends of the lock cable 30, and when the lock cable 30 is disconnected from the electrical conduction with any one of the detection interfaces, it triggers to change the state of the radio frequency unit, the state is recorded, the detection of the changed state of the radio frequency unit is carried out through wireless base station detection. For example, when the electronic tag lock is used to detect whether the container is opened, it can quickly and effectively remind the container management personnel of the occurrence of abnormal conditions.

In the description of the present application, the terms "one implementation", "some implementations", "one embodiment", "some embodiments", "examples", "specific examples", or "some examples", etc. mean that the specific features, structures, materials or characteristics described in combination with the embodiment or example is included in at least one embodiment or example of the present application. In this specification, the schematic representations of the above-mentioned terms do not necessarily refer to the same embodiment or example. Moreover, the described specific features, structures, materials or characteristics can be combined in any one or more embodiments or examples in a suitable manner.

The above content is a further detailed description of the present application in conjunction with specific implementations, and it cannot be considered that the specific implementation of the application is limited to these descriptions. For those of ordinary skill in the technical field to which the present application belongs, several simple deductions or substitutions can be made without departing from the concept of the present application.

What is claimed is:

1. An electronic tag lock, comprising:
a housing;
a lock cable;
a control circuit board; and
a clamping mechanism arranged in the housing;
wherein the housing is provided with a locking channel, the clamping mechanism acts on the lock cable inserted into the locking channel, the locking channel has an insertion opening for inserting one end of the lock cable, and an other end of the lock cable is fixed to the housing and electrically connected to the control circuit board, wherein the locking channel comprises a pressing cavity communicating with the insertion opening, the pressing cavity has a narrowing part, and a cross section of the narrowing part gradually narrows from a side away from the insertion opening to a side close to the insertion opening;
wherein the clamping mechanism comprises several clamping components electrically connected to the control circuit board, the clamping components abut against an outer circumference of the lock cable, the clamping components and the lock cable are electrically connected; and
wherein when the lock cable is inserted from the locking insertion opening to contact the clamping components and continue to be inserted along an insertion direction, the lock cable is capable of driving the clamping mechanism to reduce the clamping force of the clamping components on the lock cable, so that the lock cable is capable of moving based on the clamping mechanism in the insertion direction;
wherein the clamping mechanism further comprises an elastic component and a movable base, the movable base is arranged in the pressing cavity, the clamping component is movably arranged on an upper end of the movable base, the elastic component is arranged between the housing and the movable base, and the elastic component drives the upper end of the movable base to approach the insertion opening; and
wherein when the clamping component is at a preset position of the narrowing part, the narrowing part is capable of forcing the clamping component to abut against the outer circumference of the lock cable.

2. The electronic tag lock of claim 1, wherein when the clamping component abuts against the outer circumference of the lock cable, the lock cable is driven in an opposite direction of the insertion direction of the lock cable, and the lock cable will drive the clamping component to move, to increase the clamping force of the clamping component on the lock cable, so that the lock cable cannot be pulled out of the clamping mechanism in this direction.

3. The electronic tag lock of claim 1, wherein metal balls are configured as the clamping components.

4. The electronic tag lock of claim 1, wherein metal balls are configured as the clamping components.

5. The electronic tag lock of claim 1, wherein the movable base is provided with a base body wire hole connecting the upper end and a lower end of the movable base; the upper end of the movable base is provided with several clamping assembly parts around the base body wire hole, and the clamping components are movably arranged in the clamping assembly parts; wherein the clamping components are capable of approaching or moving away from the base body wire hole based on the clamping assembly part.

6. The electronic tag lock of claim 1, steel balls are provided as the clamping components, the upper end of the movable base is provided with several U-shaped grooves as clamping assembly parts, and the size of the arc part at the bottom of the U-shaped groove matches the diameter of the steel ball.

7. The electronic tag lock of claim 5, steel balls are provided as the clamping components, the upper end of the movable base is provided with several U-shaped grooves as clamping assembly parts, and the size of the arc part at the bottom of the U-shaped groove matches the diameter of the steel ball.

8. The electronic tag lock of claim 5, wherein three clamping assembly parts are evenly arranged around the outer circumference of the lock cable, and any clamping assembly part is provided with the clamping component.

9. The electronic tag lock of claim 5, wherein the lower end of the movable base is provided with a spring socket post, a spring is configured as the elastic component, and the elastic component is sleeved on the spring socket post.

10. The electronic tag lock of claim 1, wherein the housing comprises a front housing and a rear housing that are buckled with each other, a fixing base is clamped and mounted between the front housing and the rear housing, and the locking channel is arranged at the fixing base; the fixing base is made of metal material and is electrically connected to the control circuit board;
wherein the control circuit is provided with a first elastic sheet, and the first elastic sheet abuts against outer circumference of the fixing base to electrically conduct the fixing base;
wherein an anti-falling block is fixed at one end of the lock cable fixed to the housing, and the housing is provided with an anti-falling clamping component matching the anti-falling block;
wherein the control circuit is provided with a second elastic sheet, and the second elastic sheet abuts against the outer circumference of the lock cable to electrically conduct the lock cable.

11. The electronic tag lock of claim 1, wherein a receiving part is provided on the outer circumference of the housing, and the lock cable is capable of being received in the receiving part;
wherein an outer surface of the housing which is different from that provided with the insertion opening is provided with an elastic buckle as the receiving part;
wherein the elastic buckle is U-shaped, and the lock cable is capable of being snapped in through the elastic deformation of the opening of the elastic buckle.

* * * * *